(12) United States Patent
Gartley et al.

(10) Patent No.: US 6,467,904 B1
(45) Date of Patent: Oct. 22, 2002

(54) METHOD OF MAKING LENS WITH COLORED PORTION

(75) Inventors: Michael G. Gartley, Livonia; Daniel M. Ammon, Jr., Rochester, both of NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 128 days.

(21) Appl. No.: 09/637,135

(22) Filed: Aug. 11, 2000

(51) Int. Cl.⁷ .............................. G02C 7/04; B29D 11/00
(52) U.S. Cl. ..................... 351/177; 264/1.36; 351/162
(58) Field of Search ...................... 351/160 R, 160 H, 351/161, 162, 177; 264/1.36

(56) References Cited

U.S. PATENT DOCUMENTS

| | | | |
|---|---|---|---|
| 4,071,293 A | 1/1978 | Avery | 351/160 |
| 4,193,671 A * | 3/1980 | Erickson et al. | 361/162 |
| 4,576,453 A | 3/1986 | Borowsky | 351/162 |
| 4,582,402 A | 4/1986 | Knapp | 351/162 |
| 4,601,545 A | 7/1986 | Kern | 350/347 |
| 4,639,105 A * | 1/1987 | Neefe | 351/162 |
| 4,666,640 A * | 5/1987 | Neefe | 351/162 |
| 4,707,236 A | 11/1987 | Borowsky | 204/182.8 |
| 5,120,121 A | 6/1992 | Rawlings et al. | 351/162 |
| 5,260,000 A | 11/1993 | Nandu et al. | 264/2.1 |
| 5,414,477 A | 5/1995 | Jahnke | 351/162 |
| 5,712,721 A | 1/1998 | Large | 359/245 |

FOREIGN PATENT DOCUMENTS

DE     19850807     5/2000

* cited by examiner

Primary Examiner—Scott J. Sugarman
(74) Attorney, Agent, or Firm—John E. Thomas

(57) ABSTRACT

A method of making a lens, such as a contact lens, with a colored portion involves introducing a lens-forming monomer mixture and a colored material to a lens mold, applying a magnetic field to the monomer mixture and the colored material, whereby the colored material migrates in response to the magnetic field to form a desired pattern, and curing the lens-forming monomer mixture with the colored material forming a desired colored pattern in the lens.

13 Claims, 2 Drawing Sheets

METHOD OF MAKING LENS WITH COLORED PORTION

FIELD OF THE INVENTION

This invention relates a method of making lenses, especially contact lenses, having a colored or tinted portion.

BACKGROUND OF THE INVENTION

Various colored contact lenses are known in the art. One class of colored lenses includes "cosmetic" lenses useful for enhancing or changing the apparent color of the wearer's iris. Generally, these lenses include a colored iris section, and the colored contact lenses may include an optical correction, for example to accommodate farsightedness or nearsightedness of the wearer of the contact lens, or the contact lenses may be provided with the colored iris section solely for cosmetic purposes. Examples of such contact lenses are disclosed in U.S. Pat. Nos. 5,120,121 and 4,582, 402. The colored contact lenses of U.S. Pat. No. 4,582,402 are produced by printing a colored, opaque, intermittent pattern over the iris section of a contact lens. The colored contact lenses of U.S. Pat. No. 5,120,121 are produced by applying a pattern comprised of lens forming mixture doped with a tint to a mold surface, subjecting the mold to polymerization conditions so as to partially or fully polymerize the pattern on the mold surface, dispensing a conventional lens forming monomer mixture which does not contain ink into the mold such that it submerges the previously polymerized pattern, and polymerizing this mixture to obtain a contact lens.

SUMMARY OF THE INVENTION

This invention provides a method of making a lens, such as a contact lens, with a colored portion. The method comprises: introducing a lens-forming monomer mixture and a colored material to a lens mold; applying a magnetic field to the monomer mixture and the colored material, whereby the colored material migrates in response to the magnetic field to form a desired pattern; and curing the lens-forming monomer mixture with the colored material forming a desired colored pattern in the lens.

The lens mold may comprise a first mold section including an anterior molding surface and a second mold section including a posterior molding surface, where the lens-forming monomer mixture and the colored material are introduced to a molding cavity formed between the anterior and posterior molding surfaces. After introducing the lens-forming monomer mixture to the first mold section, the second mold section may be assembled with the first mold section to form the molding cavity.

The magnetic field may be generated by placing a magnet adjacent, for example, beneath, the lens mold. The magnet may include a central hole, so as to form an annular colored pattern in the lens generally corresponding to the iris section of the human eye.

Representative colored materials comprise magnetic pigment particles and/or a magnetic dye. Also, the colored material may comprise a mixture of magnetic particles and generally non-magnetic colored particles.

DETAILED DESCRIPTION OF VARIOUS PREFERRED EMBODIMENTS

Figure 1:
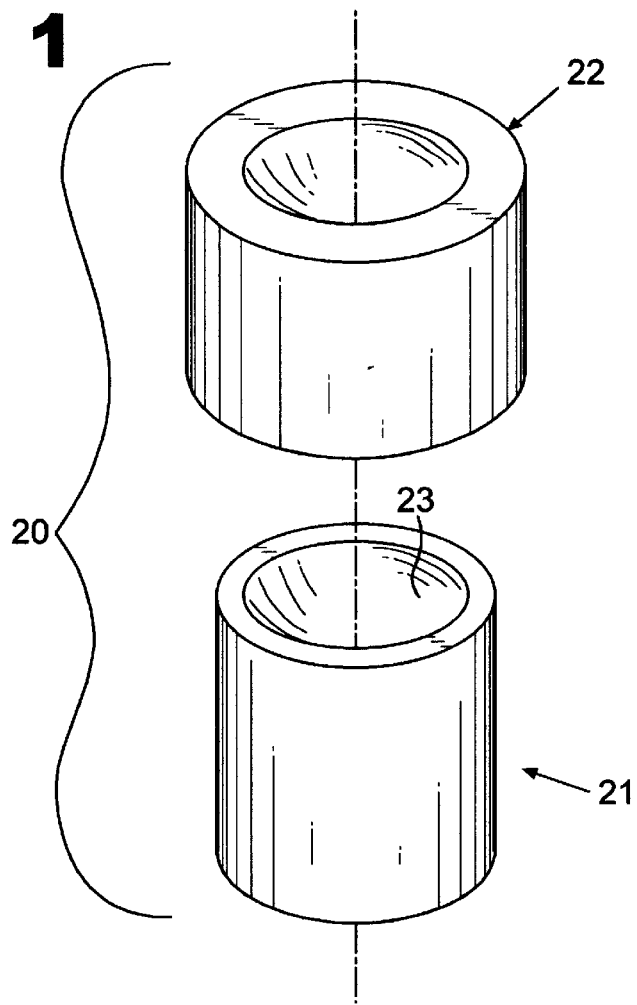
FIG. 1 is an exploded, perspective view of a representative contact lens mold assembly that may be employed in various embodiments of this invention.
Figure 2:
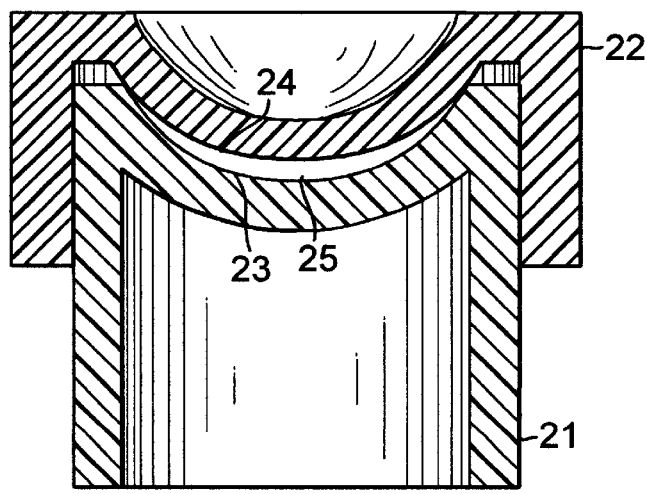
FIG. 2 is a cross-sectional view of the mold assembly of FIG. 1.
Figure 4:
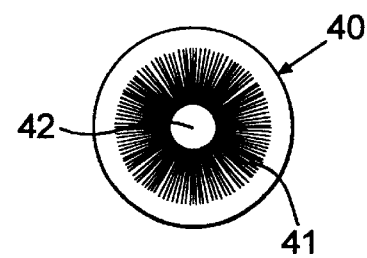
FIG. 4 is a plan view of a contact lens of this invention according to various preferred embodiments.

FIGS. 1 and 2 illustrate a first embodiment of an apparatus for practicing this invention. The lens mold assembly 20 comprises a first, anterior mold section 21 including an anterior molding surface 23, and a second, posterior mold section 22 including a posterior molding surface 24. According to conventional lens casting procedures, a lens-forming monomer mixture is introduced to the anterior mold section 21, i.e., the monomer mixture is deposited on the anterior molding surface 23. Then, the mold sections 21, 22 are brought together, to assume the general configuration shown in FIG. 2, so that a lens-shaped molding cavity 25 is defined between the anterior and posterior molding surfaces 23, 24.

Figure 3A:
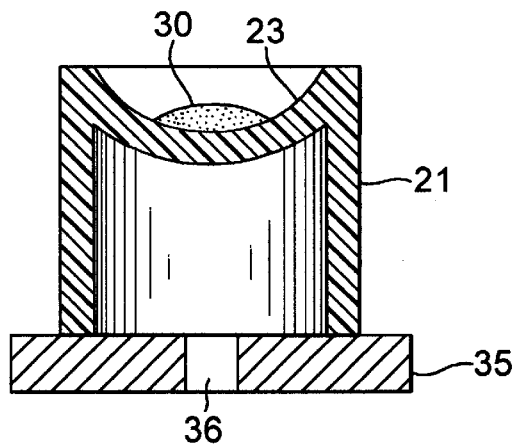
FIGS. 3a to 3d are cross-sectional views of the contact lens mold assembly of FIGS. 1 and 2, illustrating the method of this invention according to various preferred embodiments.

According to the illustrated embodiment of this invention, a colored, magnetic material is also introduced to the mold assembly, prior to fully assembling the mold sections. This colored material may be in admixture with the lens-forming monomers; as shown in FIG. 3a, this mixture 30 of the lens-forming monomer mixture and the colored, magnetic material has been deposited on surface 23 of mold section 21. Alternately, the colored material may be introduced the mold section before or after the lens-forming monomer mixture is deposited therein.

Figure 3B:
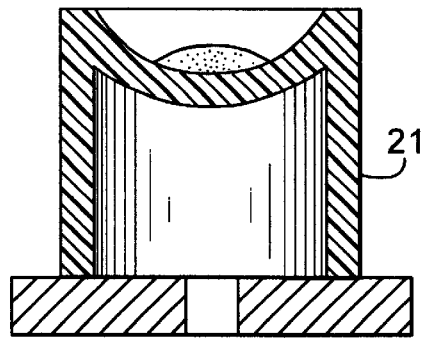
Figure 3C:
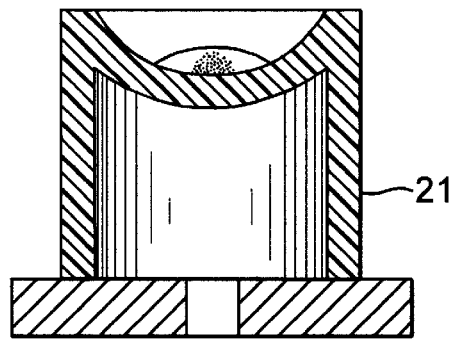

A magnetic field is applied to the mixture 30 of the lens-forming monomers mixture and colored material through magnet 35. In the illustrated embodiment, magnet 35 has a central hole 36, such that the magnet has a donut-like shape. In response to this applied magnetic field, the colored material will migrate to form a pattern generally defined by the magnetic field; as shown schematically in FIG. 3b, after a few seconds the magnetic colored material starts to spread from the center of the mixture 30. As shown schematically in FIG. 3c, after a few minutes have passed, the magnetic colored material has migrated to the edges of the drop of mixture 30.

Figure 3D:
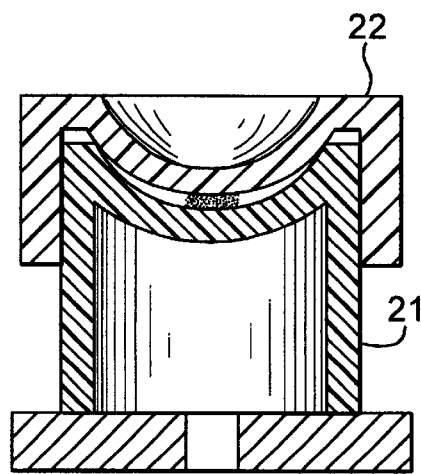

Then, the molds are fully assembled by placing mold section 22 on mold section 21, as shown in FIG. 3d, to form the lens-shaped molding cavity. The lens-forming monomer mixture is cured while the colored material is maintained in the desired pattern. Curing may be accomplished by conventional free radical polymerization processes. Generally, such processes involve the application of heat, light, or both for a sufficient time to cure the monomer mixture. The resultant molded contact lens, cured in cavity 25, is recovered by separating the mold sections 21 and 22. Accordingly, for the illustrated embodiment, a contact lens 40 is obtained, where the colored material forms an annular pattern 41, for example, an annular ring generally corresponding to the iris portion of the contact lens 40. The uncolored central section 42 may generally correspond to the pupil region of the contact lens. Due to the migration of the colored material from the central area of the mold, surprisingly, the colored pattern 41 has striations that resemble those of a natural human iris.

It will be appreciated that various patterns of colored regions may be formed by the method of this invention. For example, patterns having a shape other than a colored annular region may be formed, for example, by varying the specific arrangement of the magnetic field.

The lens-forming monomer mixtures employed in the invention include conventional lens-forming monomers. Preferably, the lens-forming monomers are monomers that are polymerizable by free radical polymerization, generally including an activated unsaturated radical, and most preferably an ethylenically unsaturated radical. (As used herein, the term "monomer" denotes relatively low molecular weight compounds that are polymerizable by free radical polymerization, as well as higher molecular weight compounds that are polymerizable by free radical polymerization and also referred to as "prepolymers", "macromonomers",and related terms.) Generally, the lens-forming monomer mixture will be liquid when added to the mold assembly. Also, the lens-forming monomer mixture will generally be clear and colorless, although it is possible for the monomer mixture to include a minor amount of tint.

An especially preferred class of materials are hydrogel copolymers. A hydrogel is a crosslinked polymeric system that can absorb and retain water in an equilibrium state. Accordingly, for hydrogels, the lens-forming monomer mixture will typically include at least one hydrophilic monomer and a crosslinking agent (a crosslinker being defined as a monomer having multiple polymerizable functionalities).

Suitable hydrophilic monomers include: unsaturated carboxylic acids, such as methacrylic acid and acrylic acid; (meth)acrylic substituted alcohols, such as 2-hydroxyethylmethacrylate and 2-hydroxyethylacrylate; vinyl lactams, such as N-vinyl pyrrolidone; and (meth) acrylarmides, such as methacrylamide and N,N-dimethylacrylamide. Typical crosslinking agents include polyvinyl, typically di- or tri-vinyl monomers, such as di- or tri(meth)acrylates of diethyleneglycol, triethyleneglycol, butyleneglycol and hexane-1,6-diol; and divinylbenzene. A specific example of a hydrogel-forming monomer mixture is polymacon, composed primarily of 2-hydroxyethylmethacrylate with a small amount of diethyleneglycol methacrylate as a crosslinking monomer. Optionally, the monomer mixture may include a silicone-containing monomer in order to form a silicone hydrogel copolymer. Examples of silicone-containing monomers include: monomers including a single activated unsaturated radical, such as methacryloxypropyl tris(trimethylsiloxy) silane, pentamethyldisiloxanyl methylmethacrylate, tris (trimethylsiloxy) methacryloxy propylsilane, methyldi (trimethylsiloxy) methacryloxymethyl silane, 3-[tris (trimethylsiloxy)silyl] propyl vinyl carbamate, and 3-[tris (trimethylsiloxy)silyl] propyl vinyl carbonate; and multifunctional ethylenically "end-capped" siloxane-containing monomers, especially difunctional monomers having two activated unsaturated radicals. A specific example of a silicone hydrogel-forming monomer mixture is balafilcon, based on N-vinyl pyrrolidone and the aforementioned vinyl carbonate and carbamate monomers, disclosed in U.S. Pat. No. 5,260,00. Many other lens-forming monomers and specific mixtures thereof are well known in the art.

As mentioned, the colored material may be mixed with the lens-forming monomers prior to introducing this mixture to the mold, or the colored material may be added to the mold section before or after the lens-forming monomer mixture is added. Representative colored materials include pigments, having the form of solid particles, and dyes. The colored material includes a magnetic component, so that it migrates in response to the applied magnetic field. The pigment or dye may be magnetic, or the pigment or dye may be mixed with a magnetic material. Optionally, an inert liquid diluent may be mixed with the pigment or dye. The amount of the colored material included with the monomer mixture will depend on the color intensity of the colored material, as well as the desired color intensity of the formed pattern in the lens. Generally, however, the colored material may be included at 0.1 to 20 weight percent, preferably 0.2 to 10 weight percent, of the total monomer mixture.

Specific examples of suitable colored materials follow. Commercially available ferromagnetic and antiferromagnetic pigments may be employed. Representative pigments include iron oxide black, iron oxide brown, iron oxide red, iron oxide yellow, chromium oxide green and chromium hydroxide green (such as those available from BF Goodrich, Cleveland, Ohio, U.S.A).

Another class of suitable material is paramagnetic particles, especially magnetic particles of polystyrene and iron oxide, including those available from Spherotech Inc. (Libertyville, Ill., U.S.A). As received from the supplier, the magnetic particles have the form of a 2.5% w/v suspension in deionized water. These magnetic particles have an average diameter of about 5 microns and include a spherical core of polystyrene coated with a monolayer of iron oxide, and the iron oxide is coated with a thin layer of polystyrene that includes functional amine groups. These particles have a rusty orange-brown color, and these particles may be used as the coloring material of this invention. Alternately, a different color may be imparted to the particles by reacting a dye with the particles. For example, a striking olive green color can be imparted to the particles by reacting the functional amine groups of the particles with an anionic blue dye, such as Alcian Blue 8GX (available from Aldrich, Milwaukee, Wis., U.S.A) or a green color can be imparted to the particles by reacting the functional amine groups of the particles with a differently colored blue dye reactive with the amine groups, such as Ingrain blue 1 (available from Aldrich). A deep brown color can be imparted to the particles by reacting the functional amine group with a dark blue dye, such as New Methylene Blue (available from Aldrich).

As mentioned, these polystyrene-based paramagnetic particles may be supplied as a 2.5% w/v suspension in deionized water. The follow procedure may be used to impart additional color to the particles, by reaction with a dye and the functional groups on the particles, and to extract the colored magnetic particles from the aqueous suspension. The desired dye is added to the aqueous suspension, and this mixture is stirred. Then, a magnet is placed below a container containing the mixture, so as to draw the magnetic particles out of suspension. After the magnetic particles settle to the bottom of the solution, the top of the mixture, containing mainly water and any unreacted dye, is skimmed off and replaced with fresh deionized water. The solution is agitated and allowed to settle again. These steps are repeated until essentially all unreacted dye is removed and the top of the mixture is clear. Ultimately, a thick slurry of colored magnetic particles in water is obtained. This slurry is dried, for example, in a flowing nitrogen atmosphere, to recover a powder of the desired colored magnetic pigments. This powder may then be mixed with the lens-forming monomers.

As mentioned previously, the amount of the colored material included with the lens-forming monomer mixture will depend on the color intensity of the colored material itself, as well as the desired color intensity of the formed pattern in the lens. It will be appreciated that differently colored magnetic materials may be mixed with the lens-forming monomer mixture to obtain various color effects in the lens. As one example, Alternately, when using reactive particles such as the aforementioned amine-functionalized polystyrene particles, the particles may be reacted with dyes of different colors. Optionally, other materials such as optical brighteners may be added to the monomer mixture to brighten the appearance of the colored material in the lens.

It is noted that the colored material may comprise a mixture of magnetic particles and generally non-magnetic colored particles. In other words, it is not necessary that the primary colorant is magnetic. As an example, the aforementioned magnetic polystyrene particles may be mixed with non-magnetic pigment particles, and then added to the lens-forming monomer mixture. As the magnetic polystyrene particles migrate in response to the magnetic field, these particles tend to pull with them the non-magnetic colored particles.

As another embodiment of this invention, the mold cavity 25 does not have to assume the shape of a finished contact lens. For example, the mold cavity may have the shape of a cylinder, whereby a cylindrical blank of cured lens material is formed therein, and this resultant cylindrical blank includes a desired colored pattern. Then, this blank may be lathe cut to form a finished contact lens.

As a further variant of the described preferred embodiment, the magnet may have the form of a movable electromagnetic probe. By controlling movement of this probe, the magnetic colored material can be arranged in a precise, desired pattern.

Many other modifications and variations of the present invention will be evident to the skilled practitioner in the field in view of the teachings herein. It is therefore understood that, within the scope of the claims, the present invention can be practiced other than as specifically described.

We claim:

1. A method of making a lens with a colored portion, comprising:

introducing a lens-forming monomer mixture and a colored material to a lens mold;

applying a magnetic field to the monomer mixture and the colored material, whereby the colored material migrates in response to the magnetic field to form a desired pattern; and curing the lens-forming monomer mixture with the colored material forming a desired colored pattern in the lens.

2. The method of claim 1, wherein the lens mold comprises a first mold section including an anterior molding surface and a second mold section including a posterior molding surface, and the lens-forming monomer mixture and the colored material are introduced to a molding cavity formed between the anterior and posterior molding surfaces.

3. The method of claim 2, wherein the lens-forming monomer mixture are introduced to the first mold section, and then the second mold section is assembled with the first mold section to form the molding cavity.

4. The method of claim 1, wherein a magnet is placed adjacent to the lens mold.

5. The method of claim 4, wherein the magnet includes a central hole.

6. The method of claim 5, wherein the central hole generally corresponds to a pupil portion of a contact lens.

7. The method of claim 1, wherein the lens is a hydrogel contact lens and the lens-forming monomer mixture includes a hydrophilic monomer.

8. The method of claim 7, wherein the lens-forming monomer mixture is cured by application of light energy, heat or both.

9. The method of claim 1, wherein the lens-forming monomer mixture and the colored material are charged simultaneously to the lens mold.

10. The method of claim 1, wherein the lens-forming monomer mixture is first charged to the lens mold, followed by charging the colored material to the mold.

11. The method of claim 1, wherein the colored material comprises magnetic pigment particles.

12. The method of claim 1, wherein the colored material comprises a magnetic dye.

13. The method of claim 1, wherein the colored material comprises a mixture of magnetic particles and generally non-magnetic colored particles.

\* \* \* \* \*